March 6, 1962 W. H. TANKE 3,023,816
TRACTOR MOUNTED CULTIVATOR
Filed March 3, 1958 4 Sheets-Sheet 1

Inventor
Willard H. Tanke
By Howard B. Scheckman
Attorney

Inventor
Willard H. Tanke
By Howard B. Scheckman
Attorney

March 6, 1962 W. H. TANKE 3,023,816
TRACTOR MOUNTED CULTIVATOR
Filed March 3, 1958 4 Sheets-Sheet 4
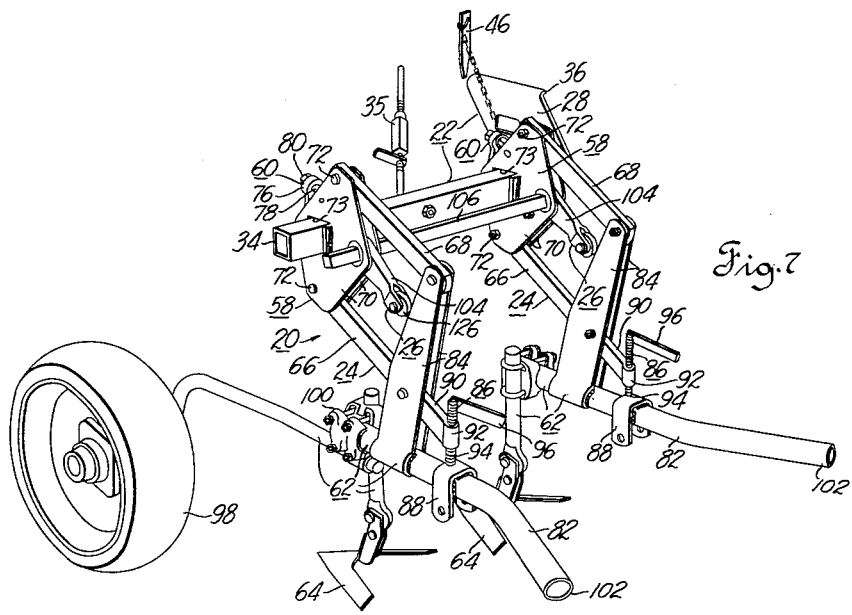
Fig.7
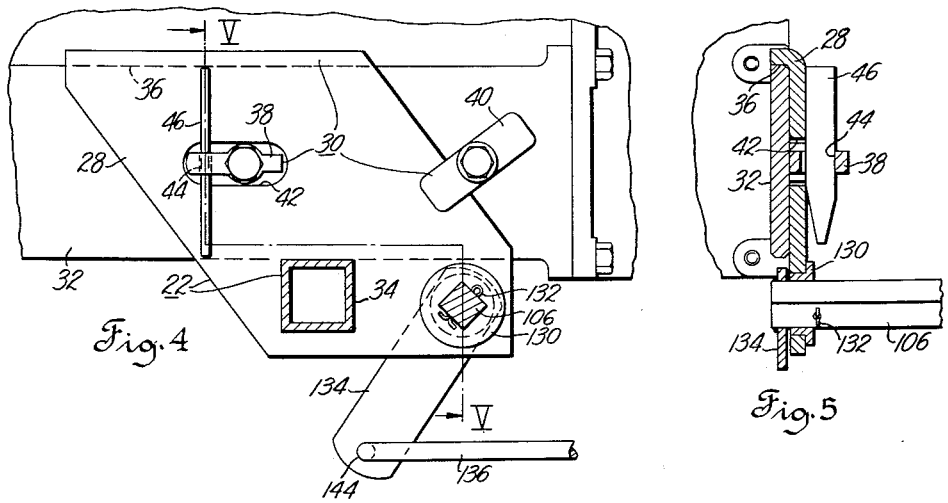
Fig.4
Fig.5
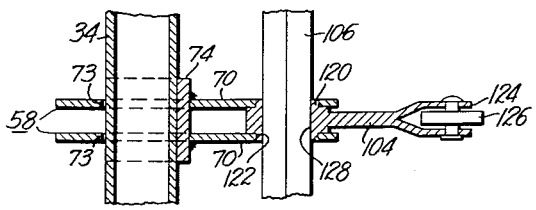
Fig.6
Inventor
Willard H. Tanke
by Howard B. Scheckman
Attorney 3,023,816
TRACTOR MOUNTED CULTIVATOR
Willard H. Tanke, La Crosse, Wis., assignor to Allis-Chalmers Manufacturing Company, Milwaukee, Wis.
Filed Mar. 3, 1958, Ser. No. 718,515
12 Claims. (Cl. 172—273)

This invention relates to a farming implement and more particularly to a cultivator.

Cultivator attachments, individually supported from the side of a tractor, have before my invention, been generally unpopular. Their unpopularity has been due to the difficulty normally encountered in assembling the relatively heavy and unwieldable cultivator attachments to the sides of the tractor. This has been partially due to the complicated lift and depth control mechanism that has been required to make the cultivator tools function properly.

It is an object of my invention to provide a cultivator attachment, individually supported from the side of the tractor, that can be handled like a wheelbarrow and easily assembled to the side of the tractor.

It is another object of this invention to provide a cultivator attachment, individually supported from the side of the tractor, that contains a compact lift mechanism that provides good visibility and easy spacing of its gangs.

It is still another object of this invention to provide a cultivator attachment, individually supported from the side of the tractor, that has a simple depth control.

Other objects and advantages will appear from the following description considered in conjunction with the attached drawings, in which:

FIG. 4 is a sectional view of FIG. 1 taken in the direction of arrows IV—IV, showing the frame plate of the cultivator attachment connected to the side of the tractor;

FIG. 5 is a sectional view of FIG. 4 taken in the direction of arrows V—V showing the frame plate lip, engaging the frame of the tractor, and the wedge that locks the plate in position;

FIG. 6 is a sectional view of FIG. 2 taken in the direction of arrows VI—VI showing the cam used to raise the gangs; and, FIG. 7 is a perspective view of one of the cultivator attachments illustrating how it can be handled like a wheelbarrow when assembling and disassembling the cultivator attachment to the tractor.

Figure 1:
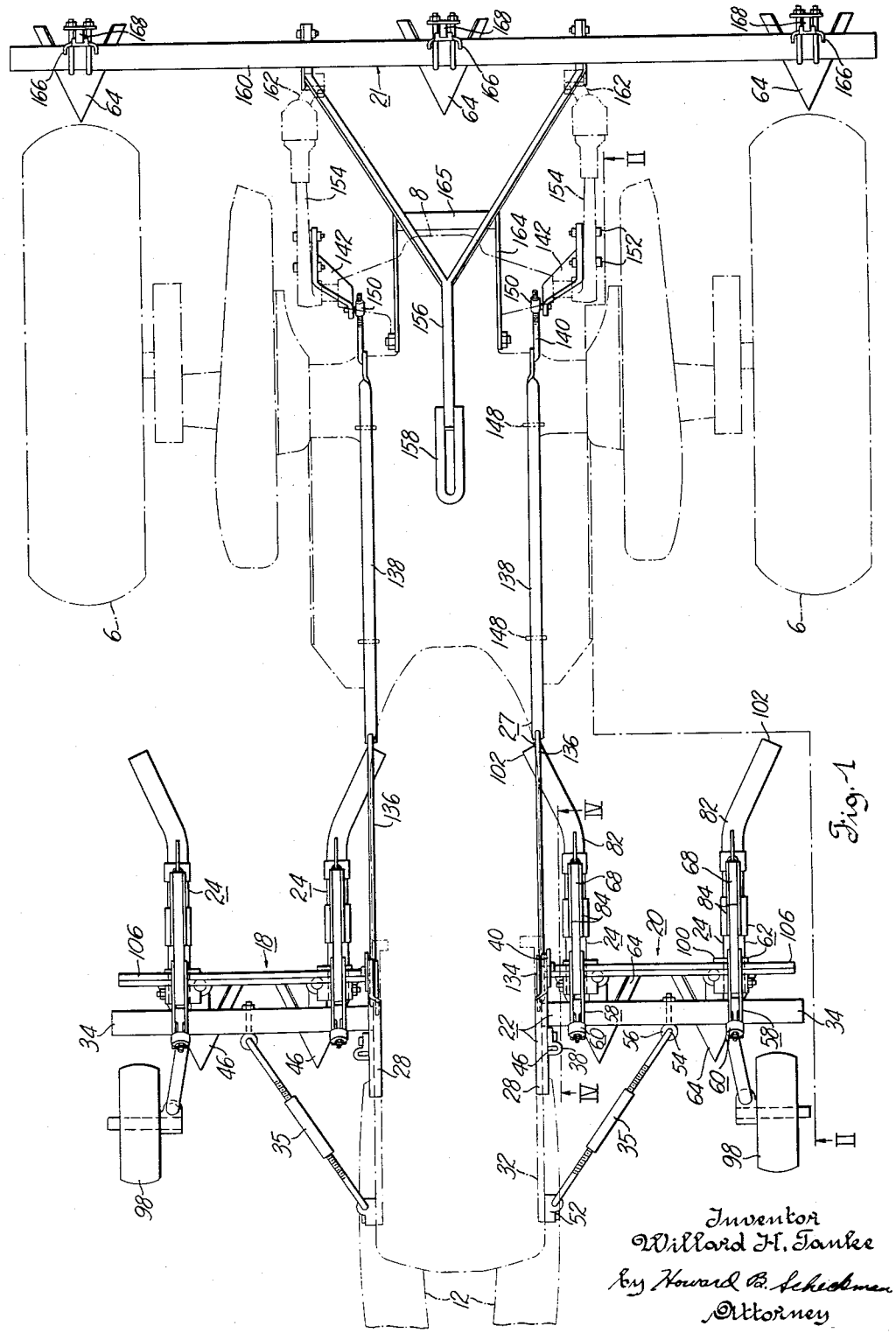
FIG. 1 is a plan view of a tractor with my cultivator attached.
Figure 2:
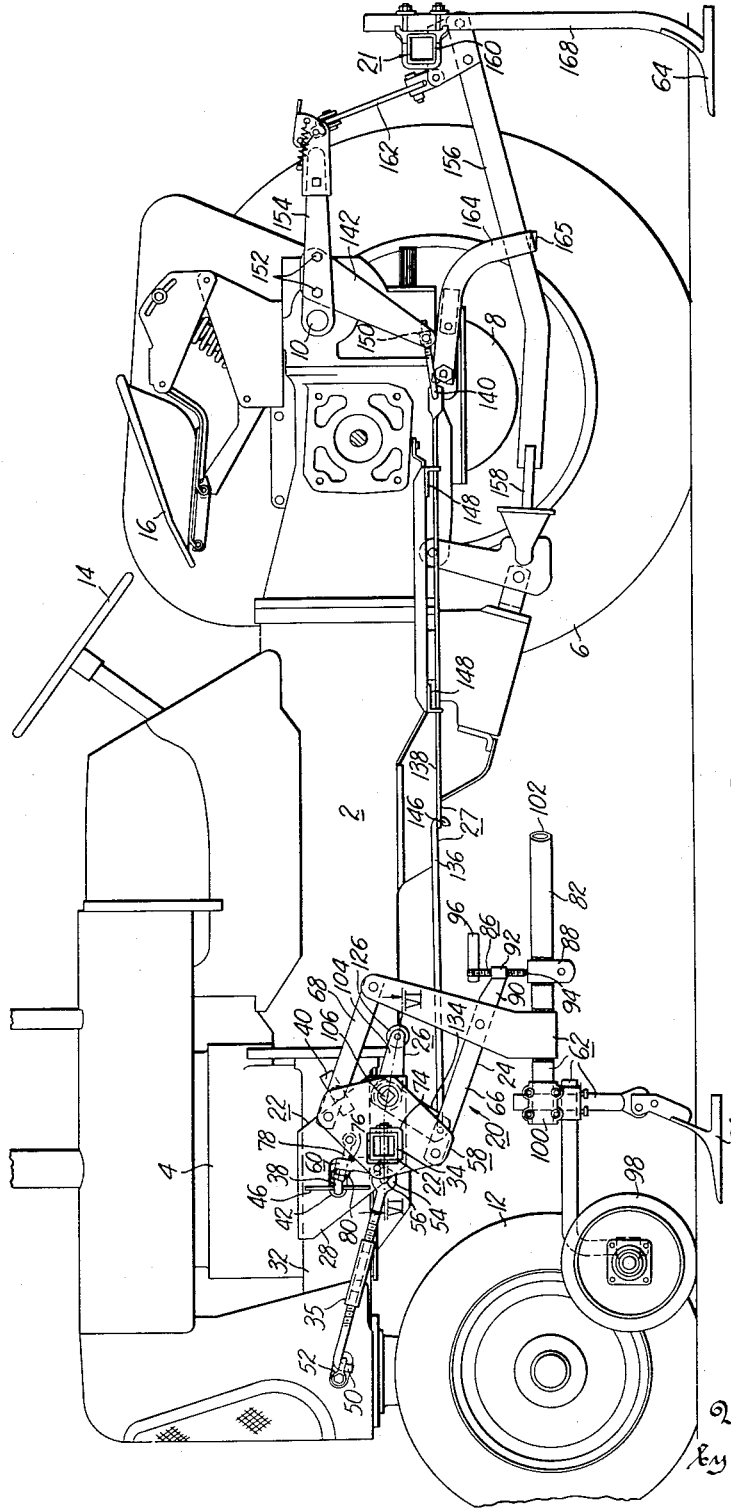
FIG. 2 is a sectional view of FIG. 1 taken in the direction of arrows II—II illustrating the side of a cultivator attachment with certain parts of the tractor omitted for clarity.
Figure 3:
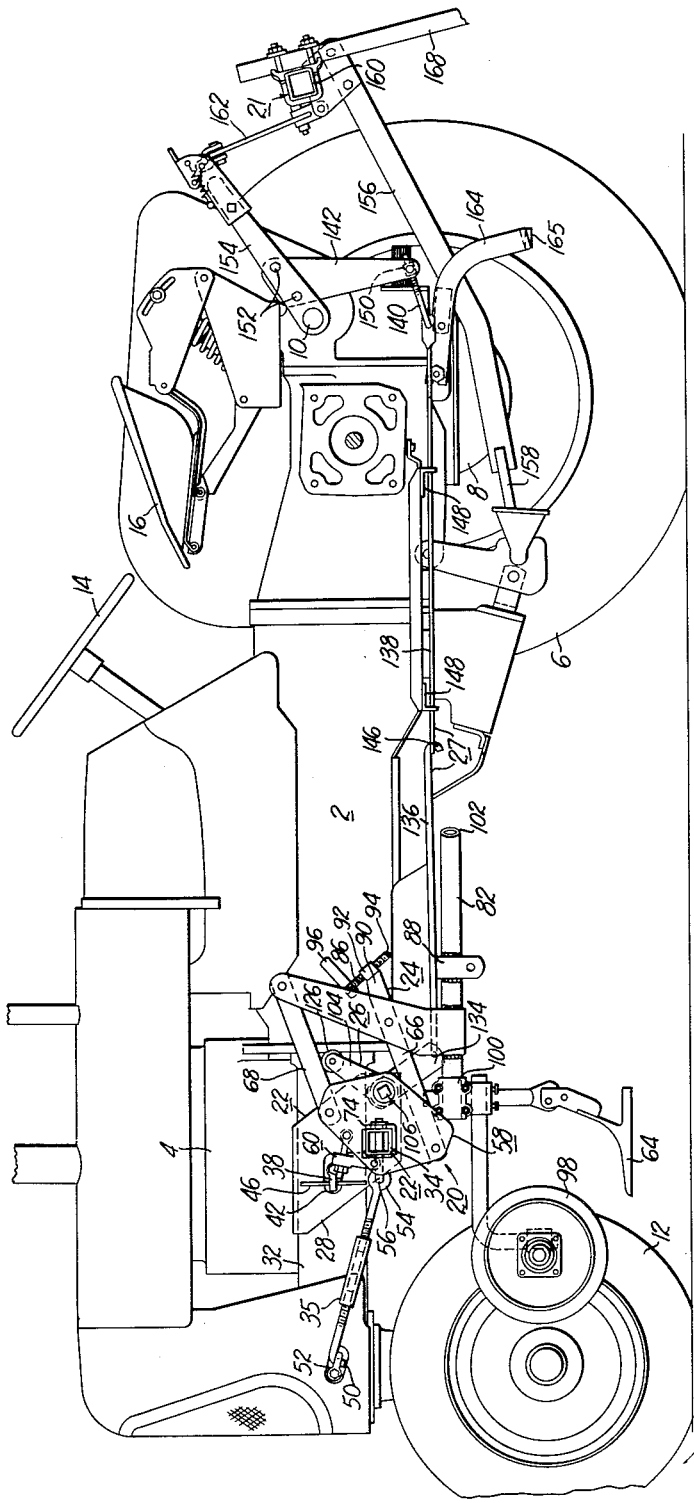
FIG. 3 is a view similar to FIG. 2 with the cultivator attachment in its raised transport position.

Referring to FIGS. 1, 2 and 3 there is illustrated a farm tractor or supporting vehicle. The tractor is of the usual type and includes (FIGS. 2 and 3) a chassis frame 2, power plant 4, rear traction wheels 6, rear axle housing 8, rearwardly located implement lift shaft 10, front wheels 12 controlled by a steering wheel 14, and an operator's seat 16.

My new cultivator (FIG. 1) is made up of two cultivator attachments 18, 20 and a conventional rear tool bar 21. The two cultivator attachments are right and left hand opposites. Only one of said attachments will be described.

Referring to FIG. 7 each cultivator attachment is made up of a side frame portion 22 connected to the side of said tractor, gangs 24 carried by frame portion 22, a lift mechanism 26 to raise and lower gangs 24, and means 27 (FIG. 3) connecting said lift mechanism to implement lift shaft 10 on said tractor.

*Side Frame Portion*

Side frame portion 22 includes a frame plate 28 (FIGS. 4 and 5), means 30 (FIG. 4) connecting said frame plate to the side frame 32 of the tractor, frame bar 34, and a turnbuckle brace member 35 (FIGS. 1–3).

Means 30 (FIG. 4) which connects frame plate 28 to the tractor is illustrated as a frame plate lip 36, locking lug 38 and wing clamp 40. Frame plate lip 36 (FIG. 5) extends horizontally. It is normal to frame plate 28 and engages the upper edge of tractor frame member 32. Lug 38 is rigidly bolted to tractor frame 32 and projects outwardly therefrom. An opening 42 in frame plate 28 receives projecting locking lug 38 (FIGS. 4 and 5). The lug is also provided with a vertical opening 44 (FIGS. 4 and 5) to receive wedge 46. Wedge 46 bears against frame plate 28 rigidly securing it to tractor frame 32. Frame plate 28 is further secured against lateral displacement by means of wing clamp 40 (FIG. 4). Wing clamp 40 is pivotally mounted on tractor frame 32 immediately to the rear of frame plate 28. A portion of wing clamp 40 extends over the edge of the frame plate when the wing is turned to the position shown in FIG. 4. The above connecting means 30 permits the frame plate to be quickly assembled on the tractor by merely hanging the frame plate from the side of the tractor prior to fastening of said plate to the side of said tractor, inserting wedge 46 in opening 44, and rotating wing clamp 40 to engage frame plate 28.

Frame plate 28 (FIG. 4) carriers frame bar 34 and is rigidly secured to it, as by welding. Frame bar 34 is a square tube that serves as a support for gangs 24 (FIG. 7).

The center portion of frame bar 34 (FIG. 1) is braced by a turnbuckle 35. Referring to FIG. 2 turnbuckle 35 is provided with a hook 50 that is received in an eye bracket 52 (FIGS. 1 and 2) provided on the tractor. The outer end of the turnbuckle has an eye 54 (FIGS. 1 and 2) connected to an eye bolt 56 (FIG. 1) bolted into frame bar 34.

*Gangs*

Gangs 24 are detachably clamped to frame bar 34. Each gang comprises hanger 58 (FIGS. 2 and 7), clamping means 60 clamping the hanger to the frame bar, tool support 62 which carries the ground engaging tools 64, and parallel links 66, 68 which pivotally connect hanger 58 and tool support 62.

Hanger 58 (FIG. 6) is made up of two hanger plates 70. Means in the form of bolts 72 (FIG. 7) secure said plates together in spaced relation. The hanger plates are provided with a square passage 73. An angle member 74 (FIGS. 2 and 6) is rigidly welded in the square passage to provide a base supporting member for square frame bar 34. Angle member 74 assures that hanger plates 70, 70 are laterally stable.

Clamping means 60 (FIGS. 2 and 7), which clamps the hanger to the frame bar, comprises a bracket 76, threaded shaft 78, and nut 80. Bracket 76 is pivotally mounted between plates 70 and positioned to engage a corner of the frame bar. Shaft 78 is also pivotally mounted between plates 70 and extends through a passage in bracket 76. Nut 80 is threaded on shaft 78. Tightening or loosening of nut 80 causes bracket 76 to engage or disengage the corner of frame bar 34 to lock or unlock hanger 58 in a selected position on the frame bar.

Parallel links 66, 68 (FIGS. 2 and 7) which pivotally connect hanger 58 and tool support 62 are vertically spaced and extend rearwardly. Their forward portions are pivotally supported by hanger 58 and are vertically swingable about parallel transverse pivot axes.

Tool support 62 (FIGS. 2 and 7) comprises a gang tube 82 to which ground engaging tools 64 are connected to, and an upstanding rigid part or standard 84. The standard is pivotally connected to the rear end portions of parallel links 66 and 68.

A stop means comprising first and second stop elements 86, 88 (FIGS. 2 and 7) is provided to limit the distance tool support 62 can be lowered. The stop means in addition to acting as a maximum depth gauge allows tool support 62 to raise in the event an obstruction is encountered in the field. Lower link 66 includes a section 90 that extends rearwardly beyond its pivotal connection to standard 84. Section 90 carries first stop element 86 which comprises a sleeve 92 and a shaft 94 threaded into it. The shaft has a handle 96 pivotally connected at its end to rotate the shaft and adjust the maximum depth the tool support can be lowered. Second stop element 88 is an abutment that is rigidly welded to gang tube 82. Second stop element 88 is positioned in the path of movement of first stop element 86 and cooperates with it to limit the maximum distance tool support 62 can be lowered. Although stop elements 86, 88 prevent tool support 62 from moving any lower, they do not prevent the tool support from being raised. When tool support 62 is raised, lower link 66 rotates counterclockwise (as viewed in FIG. 2), moving first stop element 86 away from second stop element 88 (see FIG. 3).

Tool support 62 and ground engaging implements 64 are gauged by means of a vertically adjustable gauge wheel 98 (FIGS. 1, 2 and 7). The gauge wheel is connected by a clamp 100 (FIGS. 1, 2 and 7) to the front portion of one of said gang tubes 82 of a tool support 62. The gauge wheel is connected to the outside tool support 62 when the tractor has close dual front wheels (as illustrated) and to the inside tool support 62 if the tractor has wide spaced front wheels (not illustrated). Provided on the rear portion of each of said gang tubes is a projecting part that serves as a rear handle portion 102.

Gauge wheel 98 (FIG. 7) cooperates with handle portions 102 to form a wheelbarrow arrangement. This arrangement facilitates transport and manipulation of said cultivator attachment when hooking and unhooking frame plate 28 through connecting means 30 on said tractor. All that is required, is that the cultivator attachment be lifted by handle portions 102 and rolled on gauge wheel 98. This permits each cultivator attachment 18, 20 to be easily rolled into position for assembly to the tractor.

Lift Mechanism

Lift mechanism 26 (FIG. 7) raises and lowers the gangs carried on frame bar 34. The lift mechanism comprises cams 104, and rock shaft 106 in driving engagement with said cams. There is one cam provided for each gang. The cams are identical and only one will be described. Cam 104 is carried between hanger plates 70 (FIG. 6) in the plane of parallel links 66, 68 (see FIG. 7). Means rotatably mounting said cam in said hanger is provided. Said means comprising trunnions 120 (FIG. 6) projecting in opposite directions. The trunnions are mounted for rotation in openings 122 (FIG. 6) provided in hanger plates 70. Cam 104 is provided with a bifurcated portion 124 which carries a roller 126 journalled between the bifurcation. A passage 128 is provided through said cam at its axis of rotation for reception of rock shaft 106. Trunnions 120 of the cam also serve as bearings for rock shaft 106. The end of the rock shaft is mounted in a bearing 130 (FIG. 5) which is supported for rotation in the frame plate 28. A cotter pin 132 (FIGS. 4 and 5) maintains bearing 130 in place.

Rock shaft 106 is made noncircular and passage 128 in cam 104 is also made noncircular to receive the rock shaft. This noncircular shape permits cam 104 to slide along rock shaft 106 when hangers 58 are positioned along frame bar 34 while still maintaining said rock shaft in driving engagement with said cam.

Means Connecting Lift Mechanism to Tractor Implement Lift Shaft

Means are provided for connecting rock shaft 106 to implement lift shaft 10 on said tractor, and comprises (FIG. 3) crank 134, rod 136, strap 138, link 140 and extension 142.

Crank 134 is rigidly secured, as by welding to the end of the rock shaft 106 (FIGS. 4 and 5). The free end of crank 134 is provided with an opening 144 for connecting rock shaft 106 to rod 136. The rearward end of rod 136 is provided with a formed hook 146 (FIG. 3) removably received in an opening in the forward end of strap 138. Strap 138 is slidably carried by spaced apart brackets or guides 148 (FIGS. 1 and 3) which are rigidly bolted to the tractor. The rearward end of strap 138 is adjustably connected by means of link 140 to power lift arm extension 142. Link 140 is threaded into member 150 which is pivotally mounted in the lower end of power lift arm extension 142. Extension 142 is rigidly secured, as by bolts 152, to tractor lift arm 154 connected to implement lift shaft 10 located at the rear of the tractor.

Rear Tool Bar

As is conventional, a rear tool bar and associated tools 64 are also provided.

Rear tool bar 21 (FIGS. 1–3) comprises frame 156, the forward end thereof being provided with loop 158 (FIG. 1) which is coupled to the tractor in a conventional manner. The rearward ends of the tool bar frame diverge and are secured to transverse tube 160.

Frame 156 and transverse tube 160 are connected to the tractor lift arms 154 by means of lift links 162.

A yoke member 164 (FIGS. 1 and 3) is rigidly secured to the tractor rear axle housing 8. The yoke member has a lower closed end portion 165 (FIG. 1) which supports tool bar frame 156 in its lowered working position. Yoke member 164 acts as a nonadjustable stop which limits the downward movement of the tool bar frame.

Transverse tube 160 adjustably mounts ground working tools 64, by means of U-bolt clamps 166, which carry long shanks 168 (FIGS. 2 and 3). The operating depth of tools 64 is controlled by vertically adjusting shanks 168 relative to tube 160.

*Operation.*—When the tractor is operated to lift cultivator tools 64, lift arms 154 (FIG. 3) and extensions 142 are rotated counterclockwise by implement lift shaft 10. Lift arms 154 raise rear tool bar 21 and its associated tools 64. At the same time extension strap 138 slides with rod 136 rearwardly in guides 148 and rotates crank 134 and cultivator rock shaft 106 in a counterclockwise direction. Rock shaft 106 rotates each cam 104 of each gang and causes each cam roller 126 to contact the lower edge of its upper parallel link 68 (FIG. 7). Continued movement of the cams raises the parallel links, tool supports 62, and tools 64, into their inoperative or transport position.

The operations are reversed to lower the cultivator tools. In addition, when tools 64 are lowered to ground engaging position (FIG. 2), cams 104 are rotated an additional distance clockwise to move them out of engagement with their upper links 68 so that the upper and lower parallel links are free to move.

This type of lift mechanism is simple and compact in structure and offers little obstruction to the operator's view as can be seen in FIG. 1. The compact design of the lift mechanism also lends itself to easier handling of the cultivator attachments 18 and 20 when assembling them to the tractor. Although the term "assembling" has been used, it is obvious that disassembly of the cultivator attachments can be performed with equal ease.

*In summary.*—My invention provides:

A. A construction in which cultivator attachments 18 and 20 can be easily assembled and disassembled from the tractor. The use of a gauge wheel 98, handle portions 102 on gang tubes 82, and frame plate connecting means 30, make it simple to roll the cultivator attachments like a wheelbarrow and hang them from the side of the tractor.

B. Improved lift mechanism. Use of rock shaft 106 rotatably mounting cams 104 that contact the lower edge of upper parallel links 68 to raise the links and their tool supports 62 to transport position has two advantages.

(1) This type of lift mechanism, with the cams located between the parallel linkage, is a more compact design that offers little obstruction to the operator's view.

(2) This lift mechanism makes it easier to space the hangers along the frame bar, since cams 104 require no attention or adjustment. All that is required is that clamp means 60 be loosened and hanger 58 slid along the frame bar. Since each cam 104 is carried in a hanger, the cam will automatically slide along rock shaft 106.

(C) An improved depth control mechanism for the cultivator gangs. The lower parallel link 66 carries an adjustable first stop element 86 which contacts a second stop element 88 carried by gang tube 82 to limit downward movement of tool support 62. Although, this is a simple type of adjustable depth stop it still permits tool support 62 to rise if it strikes an obstruction, provides adequate depth control, and eliminates more costly depth levers and lift shafts normally used with cultivators of this type.

Although but a single embodiment of the present invention has been illustrated and described, it will be apparent to one skilled in the art that various changes and modifications may be made therein without departing from the invention or from the scope of the appended claims.

What is claimed is:

1. In an attachment for the side of a tractor, the combination comprising: a plate; said plate including connecting means that cooperates with said tractor to releasably support said plate from the side of said tractor; a frame bar carried by said plate and extending transversely from said plate; a hanger supported for movement along said frame bar; a tool support; vertically spaced parallel links pivotally connected to said hanger and to said tool support; a first stop element carried by one of said parallel links; and a second stop element carried by said tool support, said first and second stop elements positioned to engage each other to limit the distance said tool support can be lowered; said first and second stop elements being moved by said hanger, when said hanger is moved along said frame bar.

2. In an attachment for the side of a tractor, the combination comprising: a plate; said plate including connecting means that cooperates with said tractor to releasably support said plate from the side of said tractor; a frame bar carried by said plate and extending transversely from said plate; a hanger supported for movement along said frame bar; a tool support; vertically spaced parallel links pivotally connecting said hanger and said tool support; a cam; said cam being connected to said hanger by means rotatably mounting said cam in said hanger, said cam and hanger being interconnected for joint movement; a rock shaft supported for rotation by said plate and connected in driving engagement with said cam; said cam while in driving engagement with said rock shaft, being movable along said rock shaft by said hanger; said rock shaft rotating said cam into and out of engagement with a selected one of said links of said parallel links to raise or lower said tool support, and rotating said cam away from said selected link when said tool support is in lowered position so said parallel links are free to move; and means for connecting said rock shaft to an implement lift shaft on said tractor.

3. In an attachment for the side of a tractor, the combination comprising: a plate; said plate including connecting means that cooperates with said tractor to releasably support said plate from the side of said tractor; a frame bar carried by said plate and extending transversely from said plate; a hanger supported by said frame bar; a tool support; vertically spaced parallel links pivotally connecting said hanger and said tool support; a cam; means rotatably mounting said cam in said hanger between said vertically spaced parallel links; a rock shaft supported for rotation by said plate and connected in driving engagement with said cam; said cam being provided with a noncircular passage through its axis of rotation, said rock shaft being of complementary shape and extending through said passage, said cam being slidable with said hanger along said rock shaft while in driving engagement with said rock shaft, when said hanger is moved along said frame bar, to facilitate spacing of said hanger along said frame bar, said rock shaft rotating said cam into and out of engagement with a selected one of said links of said parallel links to raise or lower said tool support and rotating said cam away from said selected link when said tool support is in lowered position so said parallel links are free to move; and means for connecting said rock shaft to an implement lift shaft on said tractor.

4. In an attachment for the side of a tractor, the combination comprising: a plate; said plate including connecting means for supporting said plate in hanging position from the side of said tractor prior to fastening of said plate to the side of said tractor, a frame bar carried by said plate and extending transversely of said plate, spaced hangers supported in parallel relation to said plate by said frame bar; a tool support for each of said spaced hangers; individual means pivotally connecting each of said tool supports to its hanger; each of said tool supports including a gang tube carrying ground engaging tools; each of said gang tubes having a front portion and a rear portion, said rear portion of two of said gang tubes each being provided with a projecting part that serves as a handle portion; a gauge wheel; means connecting said gauge wheel to the front portion of one of said gang tubes, said gauge wheel and said projecting parts of said gang tubes cooperating to form a wheelbarrow arrangement for transport and manipulation of said attachment to facilitate hooking and unhooking of said connecting means of said plate on and from said tractor; and, said attachment includes structure that is positioned to limit the movement of said hanger relative to said tool support when said connecting means is unhooked from said tractor, said structure maintaining said connecting means in a position in which it can be hooked on said tractor when said attachment is manipulated like a wheelbarrow.

5. A device as set forth in claim 4, wherein said connecting means for supporting said plate in hanging position from the side of said tractor includes a lip portion that extends from said plate and seats on a portion of said tractor.

6. A device as set forth in claim 5, wherein said plate is provided with an opening for reception of a locking lug projecting from the side of said tractor.

7. In a cultivator attachment for the side of a tractor, the combination comprising: a plate; said plate including connecting means that cooperates with said tractor to releasably support said plate from the side of said tractor; a frame bar carried by said plate and extending transversely from said plate; a hanger supported by said frame bar; a tool support; said tool support including a standard and a gang tube, said standard extending transversely from said tube, vertically spaced parallel links pivotally connecting said hanger and said standard; one of said parallel links including a section that extends beyond said standard and carries a threaded shaft; an abutment carried by said gang tube in the path of movement of said threaded shaft to limit the movement of said tool support; each of said gang tubes having a front portion and a rear handle portion; a gauge wheel; means connecting said gauge wheel to the front portion of one of said gang tubes, said gauge wheel and said rear handle portion of said gang tubes cooperating to form a wheelbarrow arrangement for transport and manipulation of said cultivator attachment to facilitate hooking and unhooking said plate connecting means with said tractor; a cam; means rotatably mounting said cam in said hanger between said parallel links; a rock shaft supported for rotation by said plate and connected in driving engagement with said cam; said cam being provided with a passage through its axis of rotation, said rock shaft extending through said passage, said cam being slidable along said rock shaft when said hanger is moved along said frame bar to facilitate spacing of said hanger along said frame bar; said rock shaft rotating said cam into and out of engagement with a selected one of said links of said parallel linkage to raise or lower said tool support and rotating said cam away from said selected link when said tool support is in lowered position so said parallel links are free to move; and means for connecting said rock shaft to an implement lift shaft on said tractor.

8. In an attachment for the side of a tractor, the combination comprising: a plate; said plate including connecting means that cooperates with said tractor to releasably support said plate from the side of said tractor; a frame bar carried by said plate and extending transversely from said plate; a hanger supported by said frame bar; a tool support; said tool support including a standard connected to a gang tube, said standard extending transversely of said gang tube; vertically spaced parellel links pivotally connecting said hanger and said standard; one of said parallel links extending beyond said standard and carrying a first stop element; a second stop element being carried by said gang tube in the path of movement of said first stop element, said first and second stop elements positioned to engage each other to limit the distance said tool support can be lowered.

9. A device as set forth in claim 8 wherein one of said stop elements is adjustably supported to vary the maximum distance said tool support can be lowered.

10. A device as set forth in claim 9 wherein said adjustable stop element is a threaded shaft and the other stop element is an abutment.

11. In an attachment for the side of a tractor, the combination comprising: a plate; said plate including connecting means that cooperates with said tractor to releasably support said plate from the side of said tractor; a frame bar carried by said plate and extending transversely from said plate; a hanger including a pair of parallel hanger plates and means connecting said hanger plates in spaced relation, said hanger plates being provided with a passage through them for slidably and nonrotatably receiving said frame bar; a tool support; vertically spaced parallel links pivotally connecting said hanger and said tool support; a cam carried between said plates; means rotatably mounting said cam in said hanger between said vertically spaced parallel links, said means including oppositely disposed trunnions rotatably supported by said spaced plates; a rock shaft supported for rotation by said plate and connected in driving engagement with said cam; said cam being provided with a noncircular passage through its axis of rotation, said rock shaft being of complementaryy shape and extending through said passage, said cam being slidable along said rock shaft when said hanger is moved along said frame to facilitate spacing of said hanger along said frame bar, said rock shaft rotating said cam into and out of engagement with a selected one of said links of said parallel links to raise or lower said tool support and rotating said cam away from said selected link when said tool support is in lowered position so said parallel links are free to move; and means for connecting said rock shaft to an implement lift shaft on said tractor.

12. A device as set forth in claim 11 wherein said cam is positioned in said hanger in the same plane as said vertically spaced parallel links.

References Cited in the file of this patent
UNITED STATES PATENTS

| | | |
|---|---|---|
| 684,507 | Goss | Oct. 15, 1901 |
| 1,251,945 | Wagner | Jan. 1, 1918 |
| 2,195,611 | Brown | Apr. 2, 1940 |
| 2,330,283 | Hipple | Sept. 28, 1943 |
| 2,369,759 | Smith | Feb. 20, 1945 |
| 2,569,389 | Seaholm | Sept. 25, 1951 |
| 2,793,577 | Paige | May 28, 1957 |